United States Patent
Yamanoi et al.

(10) Patent No.: US 7,093,515 B2
(45) Date of Patent: Aug. 22, 2006

(54) ACCELERATOR PEDAL DEVICE FOR A VEHICLE

(75) Inventors: Toshimi Yamanoi, Isehara (JP); Toshio Hirota, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 191 days.

(21) Appl. No.: 10/678,092

(22) Filed: Oct. 6, 2003

(65) Prior Publication Data

US 2004/0089490 A1    May 13, 2004

(30) Foreign Application Priority Data

Oct. 9, 2002   (JP)   .............. 2002-095972
Sep. 2, 2003   (JP)   .............. 2003-309983

(51) Int. Cl.
  *G05G 1/14*   (2006.01)
  *B60R 21/00*  (2006.01)
  *B60R 21/16*  (2006.01)

(52) U.S. Cl. .............. 74/513; 74/512; 280/735; 180/269

(58) Field of Classification Search ............... 74/512, 74/513, 514, 560; 180/269; 280/735; 73/132; B60R 22/48; F02D 29/02
See application file for complete search history.

(56) References Cited

U.S. PATENT DOCUMENTS

| | | | |
|---|---|---|---|
| 5,012,689 A * | 5/1991 | Smith ................. | 74/89.17 |
| 5,309,361 A * | 5/1994 | Drott et al. .............. | 701/1 |
| 5,413,378 A * | 5/1995 | Steffens et al. ............. | 280/735 |
| 5,483,825 A * | 1/1996 | Greenbaum .................. | 73/132 |
| 6,352,007 B1 * | 3/2002 | Zhang et al. ................. | 74/512 |
| 6,820,895 B1 * | 11/2004 | Levine ........................ | 280/735 |
| 6,860,355 B1 * | 3/2005 | Houten et al. ............. | 180/269 |

FOREIGN PATENT DOCUMENTS

| | | | |
|---|---|---|---|
| EP | 001013516 A1 | * | 6/2000 |
| FR | 2 813 837 | * | 3/2002 |
| JP | 62-152925 | * | 7/1987 |
| JP | 11-294214 A | | 10/1999 |

OTHER PUBLICATIONS

Halliday Resnick Physics, Parts I & II, Publisher John Wiley & Sons, Inc., 1967, pp. 87 and 88.*

* cited by examiner

*Primary Examiner*—Vinh T. Luong
(74) *Attorney, Agent, or Firm*—Foley & Lardner LLP

(57) ABSTRACT

When a seat belt 14 is unfastened, reactive force against treading pressure on the accelerator pedal is enhanced by a pedal reactive force enhancer 10 even if a driver tries to drive a vehicle by turning on an ignition switch 18 and pressing on the accelerator pedal. Thus, it is possible to prompt the driver to fasten the seat belt. When the seat belt is unfastened in an emergency, although the reactive force against treading pressure on the accelerator pedal is enhanced, the driver can drive the vehicle by pressing the accelerator pedal harder. In this way, the driver can deal with such emergency.

4 Claims, 8 Drawing Sheets

ACCELERATOR PEDAL DEVICE FOR A VEHICLE

BACKGROUND OF THE INVENTION

1. Field of the Invention

The present invention relates to an accelerator pedal device for a vehicle.

2. Description of the Related Art

There is known a technology in which a fuel injection control corresponding to a pressing amount on an accelerator pedal is inhibited in the event that car speed detected by a speed sensor exceeds a given value while a belt fastening sensor detects an unfastened seat belt (see Japanese Unexamined Patent Publication No. 11(1999)-294214, p. 2, FIG. 1, for example).

However, according to the conventional device, an engine stalls when a seat belt is unfastened even if a driver wishes to drive a vehicle in an emergency. Accordingly, the driver may not deal with such an emergency.

SUMMARY OF THE INVENTION

In consideration thereof, the present invention provides an accelerator pedal device, which is capable of prompting a driver to fasten a seat belt by enhancing reactive force against treading pressure on an accelerator pedal when the seat belt is unfastened and capable of allowing the driver to drive a vehicle by pressing on the accelerator pedal in an emergency even if the seat belt is unfastened.

An accelerator device according to the present invention includes a belt fastening detector configured to detect fastening and unfastening states of a seat belt, and a pedal reactive force enhancer configured to enhance reactive force against treading pressure on an accelerator pedal when an ignition switch is turned on while the seat belt is unfastened, based on a detecting operation of the belt fastening detector.

According to the present invention, when the seat belt is unfastened, the reactive force against trading pressure on the accelerator pedal is enhanced when a driver tries to drive a vehicle by turning on an ignition switch and pressing on the accelerator pedal. In this way, the device can prompt the driver to fasten the seat belt.

Meanwhile, even when the seat belt is unfastened in an emergency, although the reactive force against treading pressure on the accelerator pedal is enhanced, the driver can drive the vehicle by pressing the accelerator pedal. In this way, the driver can deal with such emergency.

DESCRIPTION OF THE PREFERRED EMBODIMENTS

Now, description will be made regarding embodiments of the present invention with reference to the accompanying drawings.

Figure 1:
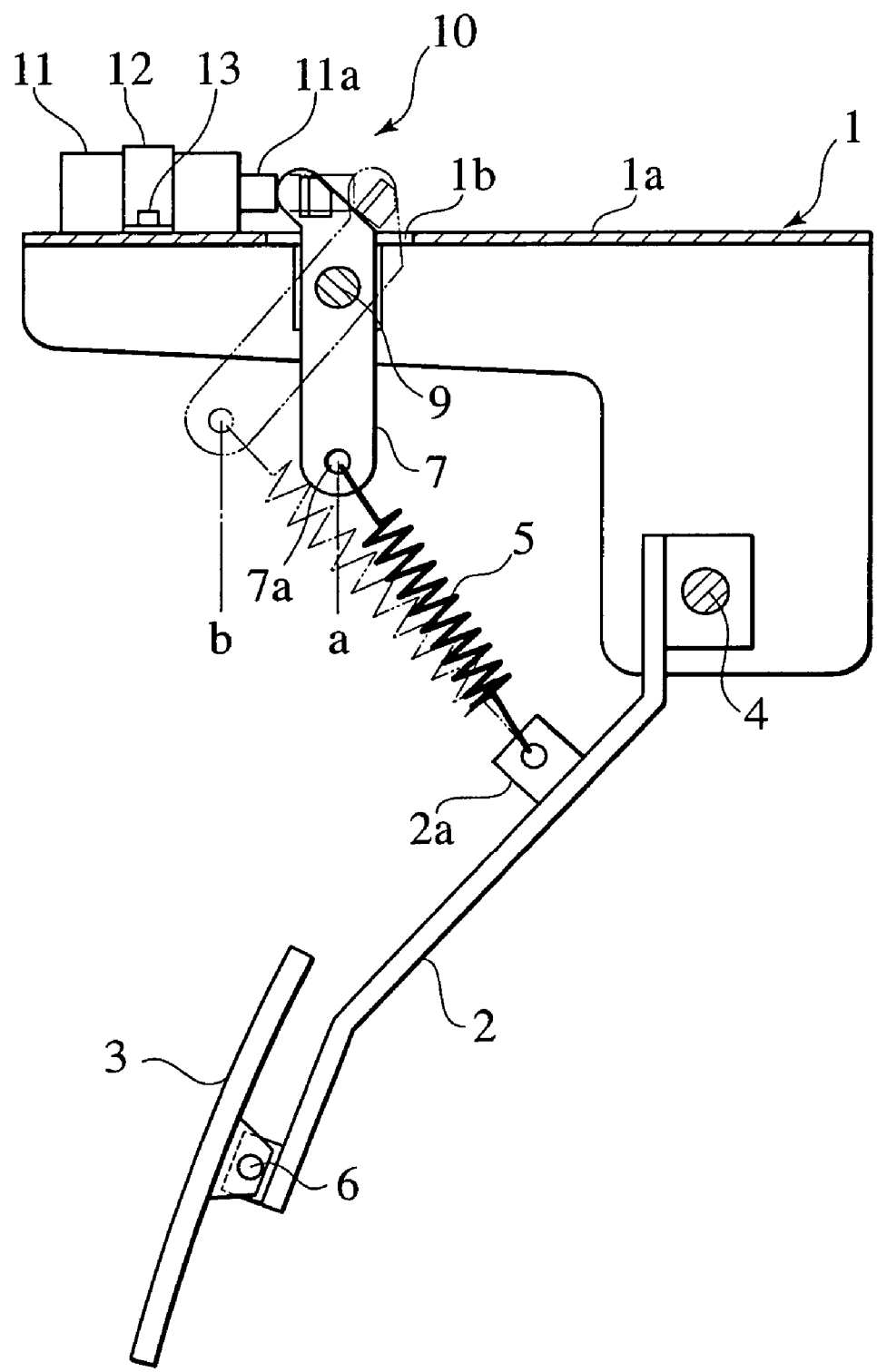
FIG. 1 is a side view showing a first embodiment of the present invention.
Figure 3:
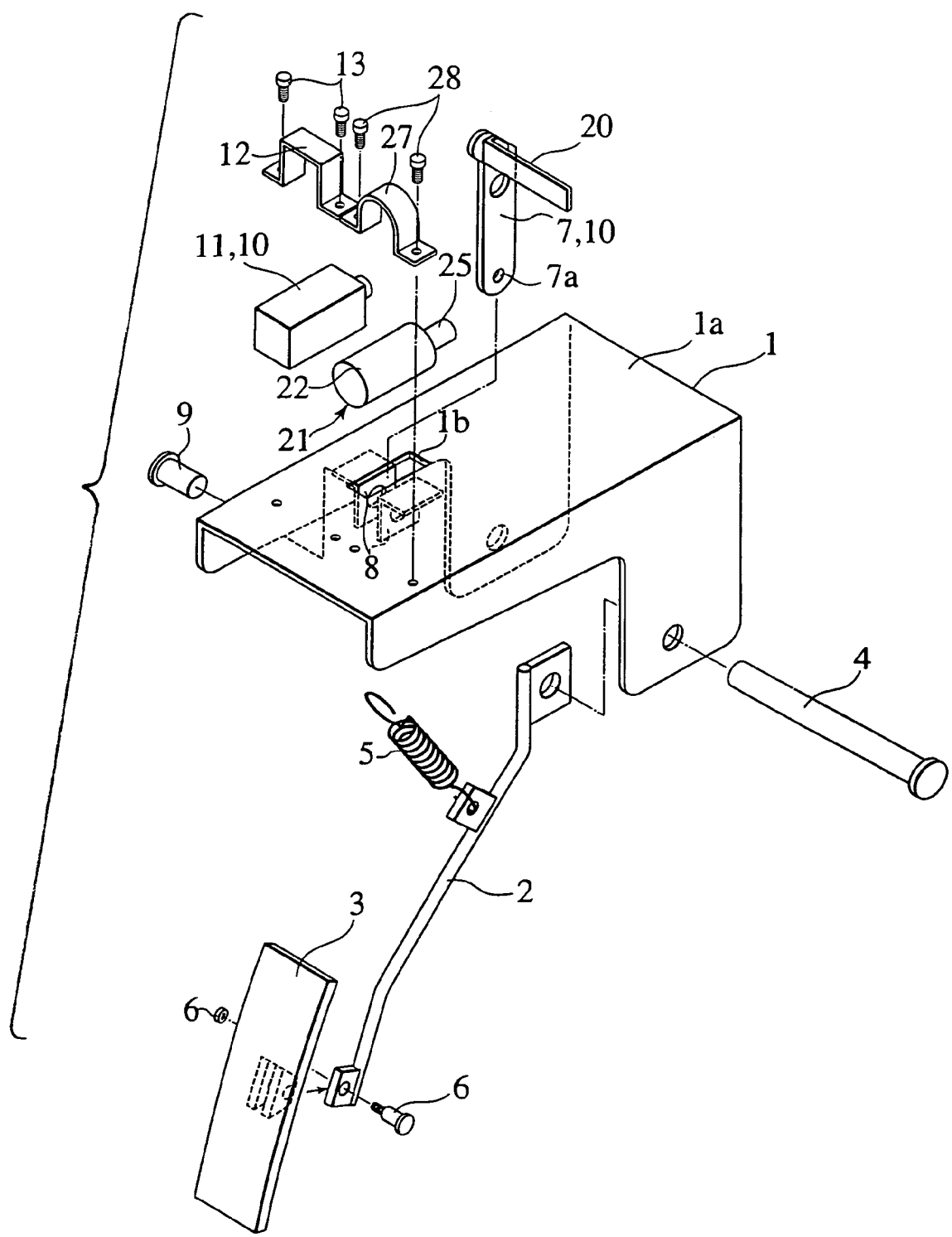
FIG. 3 is an exploded perspective view of the first embodiment of the present invention.

As shown in FIG. 1 and FIG. 3, an accelerator pedal device of a first embodiment of the present invention includes a pedal bracket 1 serving as a pedal supporting member to be fixed to a car body member, a pedal arm 2 being rotatably supported at an upper end thereof onto the pedal bracket 1 with a spindle 4 and fixing a pedal 3 onto a lower end thereof with a bolt and nut 6, and a return spring 5 which retains the pedal arm 2 in an initial position where rotation is regulated by an unillustrated stopper.

The pedal bracket 1 includes a flat upper wall 1a, and a hole 1b is provided in the upper wall 1a.

Reference numeral 7 denotes a lever which is disposed so as to allow an upper end thereof to protrude from the hole 1b toward an upper side of the upper wall 1a. The lever 7 is rotatably fitted to a bracket 8 installed fixedly to a lower surface of the upper wall 1a by use of a spindle 9.

A lower end of the return spring 5 is hooked on a spring latch 2a of the pedal arm 2, and an upper end of the return spring 5 is hooked on a spring latch 7a at a lower end of the lever 7.

An electromagnetic actuator 11 as an actuator for operating the lever 7 is arranged on the upper wall 1a of the pedal bracket 1.

The electromagnetic actuator 11 is assembled by a clamp 12 and the clamp 12 is fixed to the upper wall 1a with screws 13, whereby the upper end of the lever 7 is allowed to abut on an operating plug 11a end of the electromagnetic actuator 11.

When the operating plug 11a is pushed forward by excitation of the electromagnetic actuator 11, the upper end of the lever 7 moves the spring latch 7a on the lower end thereof from a position a to a position b as illustrated with imaginary lines so as to enhance tension of the return spring 5. The lever 7 and the electromagnetic actuator 11 collectively constitute a spring tension enhancing mechanism 10 which serves as a pedal reactive force enhancer.

Figure 4:
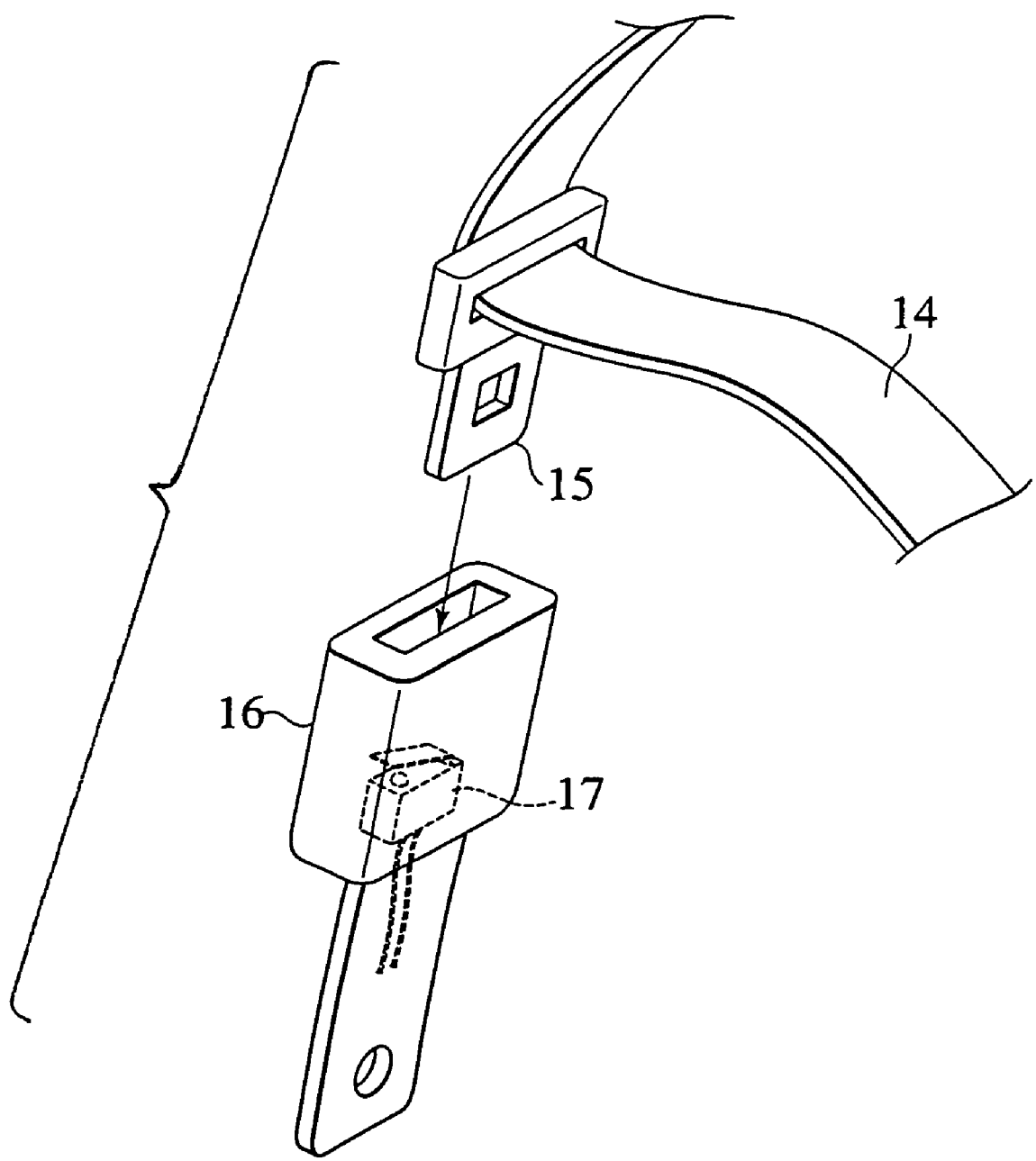
FIG. 4 is a perspective view showing a state of configuration of a belt fastening detector according to the first embodiment of the present invention.
Figure 5:
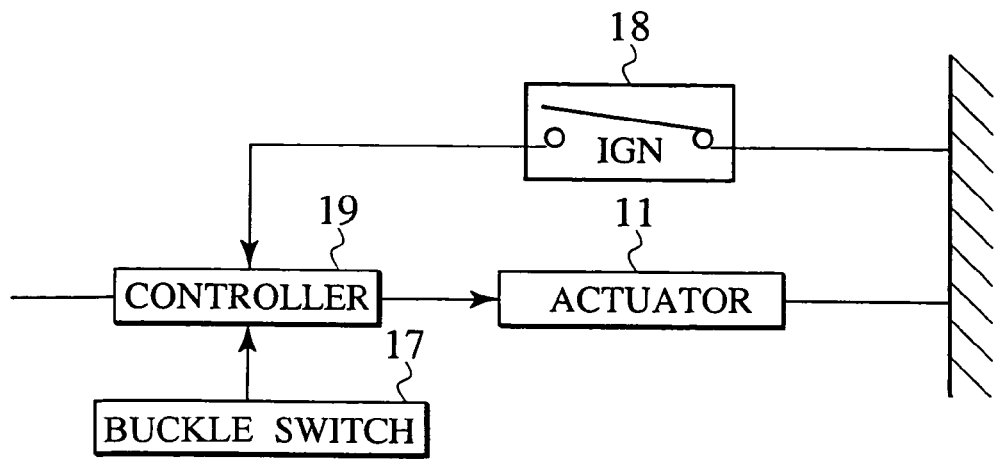
FIG. 5 is an actuator activation circuit diagram according to the first embodiment of the present invention.

The electromagnetic actuator 11 is operated by a controller 19 based on a detecting operation of a buckle switch 17 which serves as a belt fastening detector configured to detect fastening or unfastening of a seat belt 14 shown in FIGS. 4 and 5.

The buckle switch 17 is turned off when the seat belt 14 is fastened by inserting and thereby hooking a tongue 15 to a buckle 16. The buckle switch 17 is turned on when the tongue 15 is not inserted into and hooked on the buckle 16 and thus the seat belt 14 is unfastened.

The controller 19 receives each ON or OFF signal from the buckle switch 17 and the ignition switch 18. If the buckle switch 17 is turned on due to unfastened seat belt 14 in the state where the ignition switch 18 is turned on, then the controller 19 supplies a drive signal to the electromagnetic actuator 11 to excite the electromagnetic actuator 11 to move the operating plug 11a forward. In this way, the lower end of the lever 7 is moved from the position a to the position b to enhance the tension of the return spring 5 so as to enhance the reactive force against pressure on the accelerator pedal.

A control of the electromagnetic actuator 11 by the controller 19 is explained with reference to the flowchart of FIG. 6. First, when making a judgment that the ignition switch 18 is turned on to start the engine at the step S1, the flow goes to the step S2. At the step S2, when making a judgment that the buckle switch 17, which is always in ON state, is in ON state (unfastened seat belt), the electromagnetic actuator 11 is excited at the step S3.

At step S2, when making a judgment that the buckle switch 17 is in OFF state (fastened seat belt), the electromagnetic actuator 11 is unexcited at the step S4.

Figure 2A:
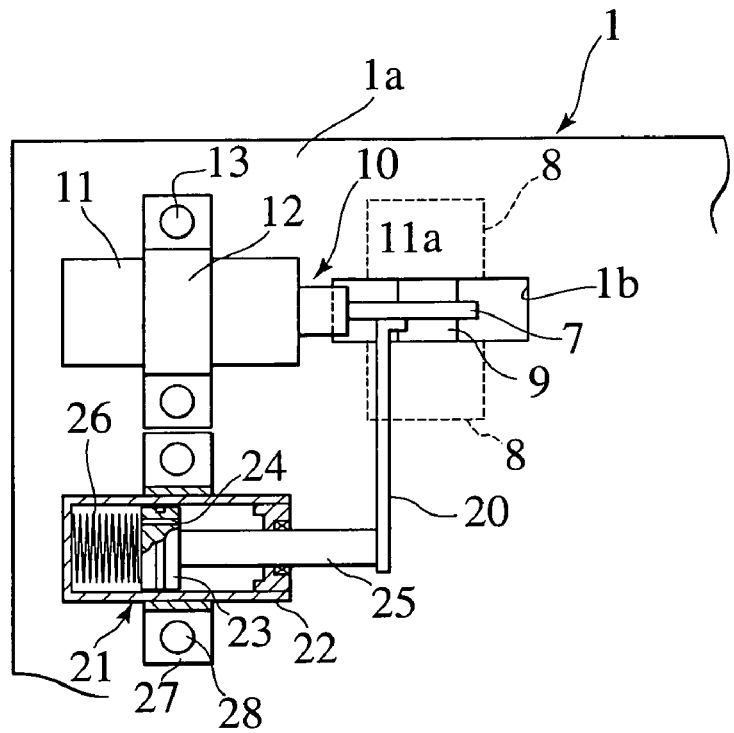
FIGS. 2A and 2B are plan views of the first embodiment of the present invention respectively showing the state where an actuator is inactive and the state where the actuator is active.
Figure 2B:
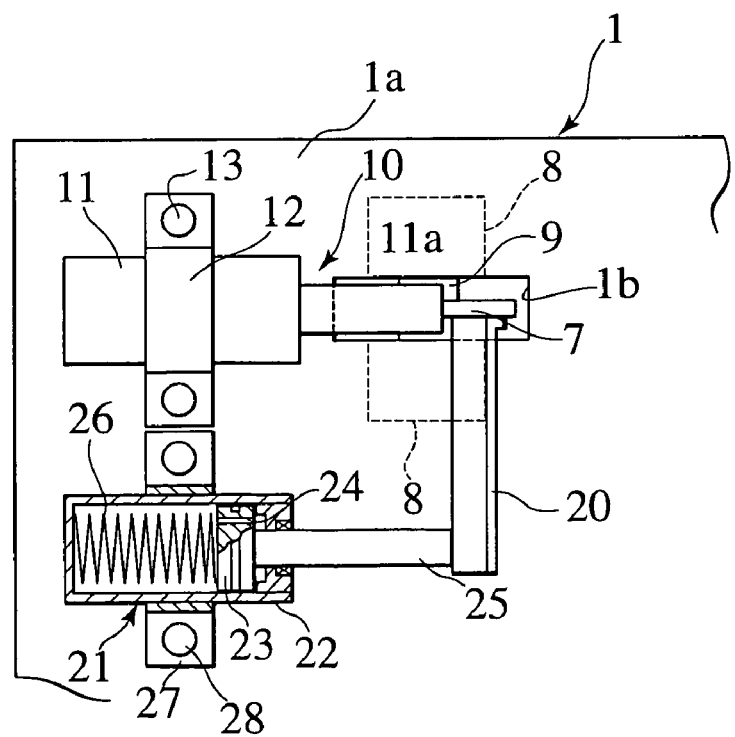

An arm 20 is provided on the upper end of the lever 7 so as to jut toward one side as shown in FIGS. 2A and 2B. On the upper wall 1a, there is a damper mechanism 21 arranged to oppose to the arm 20 and thereby restrained a sudden returning operation of the lever 7.

The damper mechanism 21 includes: a cylinder 22 which is filled with operating oil and is fixed onto the upper wall 1a via a clamp 27 by use of screws 28; a piston 23 which is provided with an orifice 24 and is arranged to be slidably movable inside the cylinder 22; a piston rod 25 which is installed fixedly to the piston 23 and protrudes toward outside the cylinder; and a spring 26 which is arranged inside the cylinder 22 to energize the piston 23 toward the moving direction of the piston rod 25.

Regarding this damper mechanism 21, when the lever 7 moves from the position a to the position b, the piston rod 25 follows movement of the arm 20 in response to the spring force of the spring 26. When the electromagnetic actuator 11 is demagnetized, the damper mechanism 7 restrains the sudden returning operation of the lever 7 back to the position a by a squeeze effect of the orifice 24.

Therefore, the spring force of the spring 26 of the damper mechanism 21 is set smaller than the force of the return spring 5.

According to the above-described structure of the first embodiment, the ignition switch 18 is turned on and the accelerator pedal is pressed on to start the vehicle. In this event, if the seat belt 14 is unfastened, then the electromagnetic actuator 11 is excited to make the operating plug 11a move forward because the buckle switch 17 is turned on, whereby the lever 7 is moved from the position a to the position b and the tension of the return spring 5 is thereby enhanced.

For this reason, the reactive force against the treading pressure on the accelerator pedal is enhanced and the pedal 3 becomes heavier to be pressed on. In this way, it is possible to prompt a driver to fasten the seat belt 14.

Moreover, although the pedal 3 becomes heavier to be pressed on due to enhancement in the reactive force against the pressure on the accelerator pedal as described above when the seat belt 14 is unfastened, it is still possible to press the pedal harder to drive the vehicle in an emergency. Accordingly, it is possible to deal with such an emergency.

Here, if the driver inserts and thereby hooks the tongue 15 of the seat belt 14 on the buckle 16 to fasten the seat belt 14 on the way of the pressing operation on the accelerator pedal while unfastening the seat belt 14 as described above, then the electromagnetic actuator 11 is demagnetized by an turning-off operation of the buckle switch 17 and the operating plug 11a moves back. However, since the piston rod 25 of the damper mechanism 21 moves forward and abuts on the arm 20 of the lever as shown in FIG. 2B, the sudden returning operation back to the position a with the lever 7 is restrained.

Therefore, it is possible to avoid discomforting the driver with sudden light feeling during pressing on the accelerator pedal 3.

According to this embodiment, the return spring 5 of the accelerator pedal is effectively used as the pedal reactive force enhancer and the spring tension enhancing mechanism 10 for enhancing the tension thereof is constituted as described above. Therefore, it is possible to obtain the accelerator pedal device with cost advantages.

Moreover, since this spring tension enhancing mechanism 10 is composed of the lever 7 and the electromagnetic actuator 11 configured to push the lever 7 and thereby to move one end of the return spring 5 toward the pulling side, it is possible to reduce the number of components as small as possible and to avoid a size increase of an accelerator pedal unit.

Figure 7A:
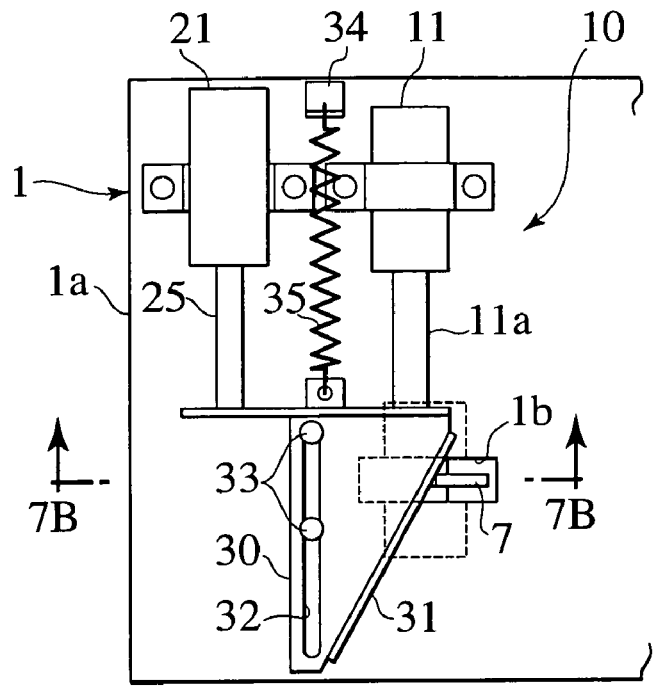
FIG. 7A is a plan view showing an active state of an actuator according to a second embodiment of the present invention.
Figure 7B:
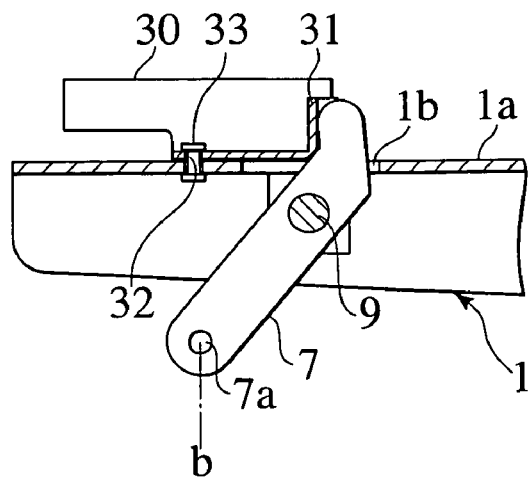
FIG. 7B is a cross-sectional view taken along the 7B—7B line in FIG. 7A.
Figure 8A:
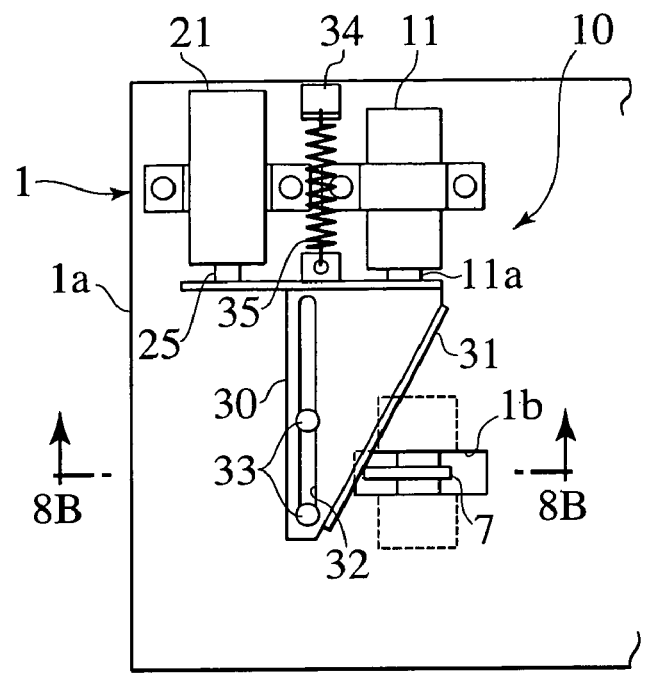
FIG. 8A is a plan view showing an inactive state of the actuator according to the second embodiment of the present invention.
Figure 8B:
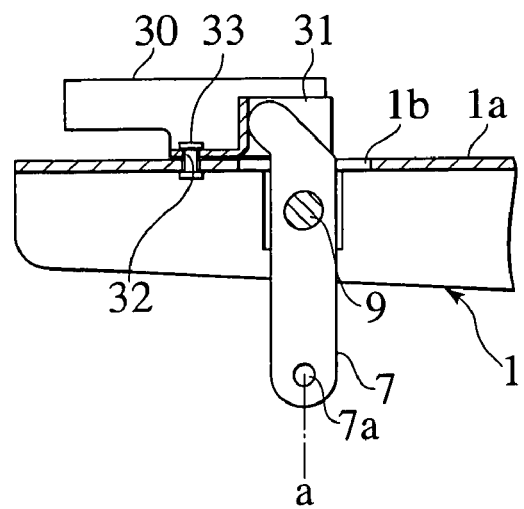
FIG. 8B is a cross-sectional view taken along the 8B—8B line in FIG. 8A.

FIGS. 7A, 7B, 8A and 8B are views showing a second embodiment of the present invention. FIG. 7A is a plan view showing an excited state of an electromagnetic actuator 11. FIG. 7B is a cross-sectional view taken along the 7B—7B line in FIG. 7A. FIG. 8A is a plan view showing a state of demagnetization of the electromagnetic actuator 11. FIG. 8B is a cross-sectional view taken along the 8B—8B line in FIG. 8A.

In this second embodiment, a cam plate 30 provided with a slanted cam portion 31 on one side edge thereof is slidably arranged on an upper wall 1a of a pedal bracket 1, and an upper end of a lever 7 is disposed so as to contact slidably with the cam portion 31 of this cam plate 30.

A guide hole 32 is formed on the cam plate 30 along the longitudinal direction thereof, and two guide pins 33, which are arranged on the upper wall 1a in a standing manner, are inserted into and engaged with this guide hole 32.

An operating plug 11a of the electromagnetic actuator 11, which is fixed onto the upper wall 1a as similar to the first embodiment, abuts on one end in the longitudinal direction of the cam plate 30, and a piston rod 25 of a damper mechanism 21 is also disposed in an abutting manner.

Moreover, in the same side of disposition as the electromagnetic actuator 11 and the damper mechanism 21, a spring 35 is provided to be stretched between a bracket 34 installed fixedly on to the upper wall 1a and one end of the cam plate 30. Accordingly, the one end of the cam plate 30 is allowed to abut consistently on the operating plug 11a and on the piston rod 25 by spring force of the spring 35.

Figure 6:
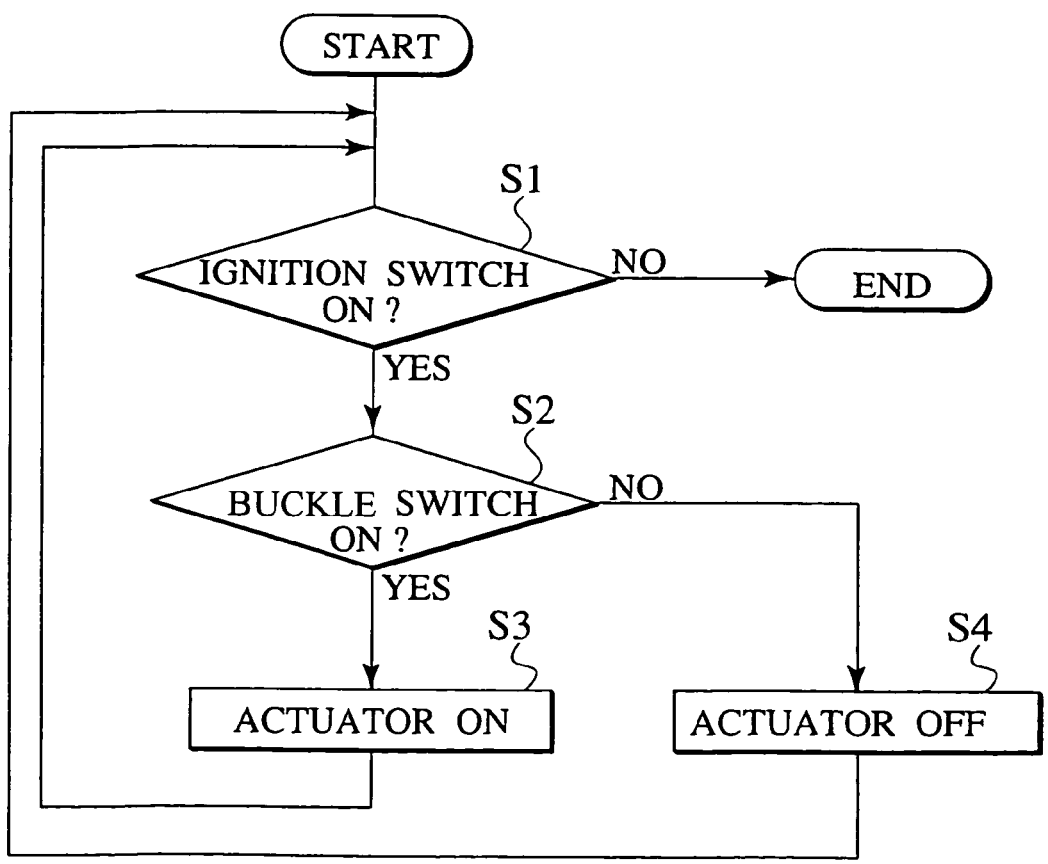
FIG. 6 is a flowchart for performing a control of the actuator according to the first embodiment of the present invention.

In this second embodiment, the electromagnetic actuator 11 is operated by the same actuator activation circuit as that shown in FIG. 5 and along the same flowchart as that shown in FIG. 6 in the first embodiment. When the electromagnetic actuator 11 is excited by an activation circuit, the cam plate 30 is pushed to move from the state shown in FIGS. 8A and 8B to the state shown in FIGS. 7A and 7B. Accordingly, the position of slidable contact between the upper end of the lever 7 and the cam portion 31 is shifted upward and slant-wise on the cam portion 31. In this way, a lower end of the lever 7 is moved from a position a to a position b, and tension of a return spring 5 of the accelerator pedal is thereby enhanced.

Therefore, according to this embodiment, an operation and an effect similar to those of the first embodiment are obtained, and furthermore, an output and an operation stroke of the electromagnetic actuator 11 can be reduced as compared to directly pushing the upper end of the lever 7 with the operating plug 11a of the electromagnetic actuator 11. Hence, it is possible to achieve downsizing of the electromagnetic actuator 11.

Figure 9:
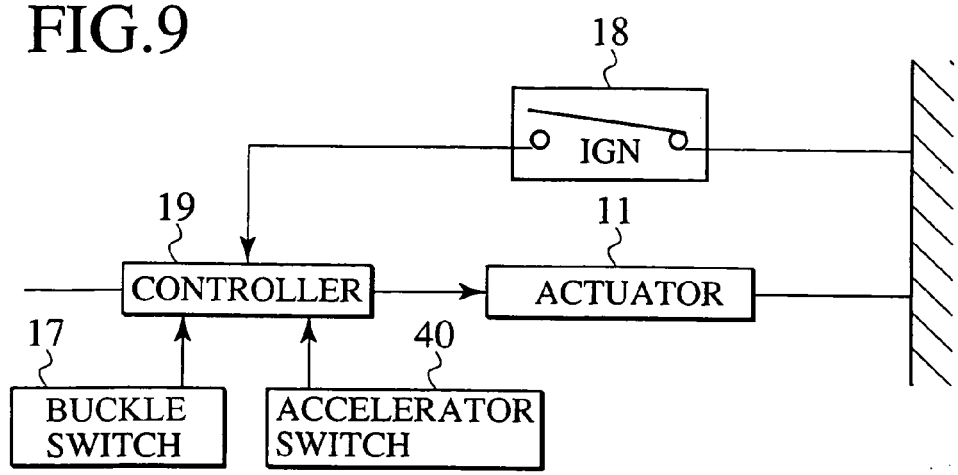
FIG. 9 is an actuator activation circuit diagram according to the third embodiment of the present invention.
Figure 10:
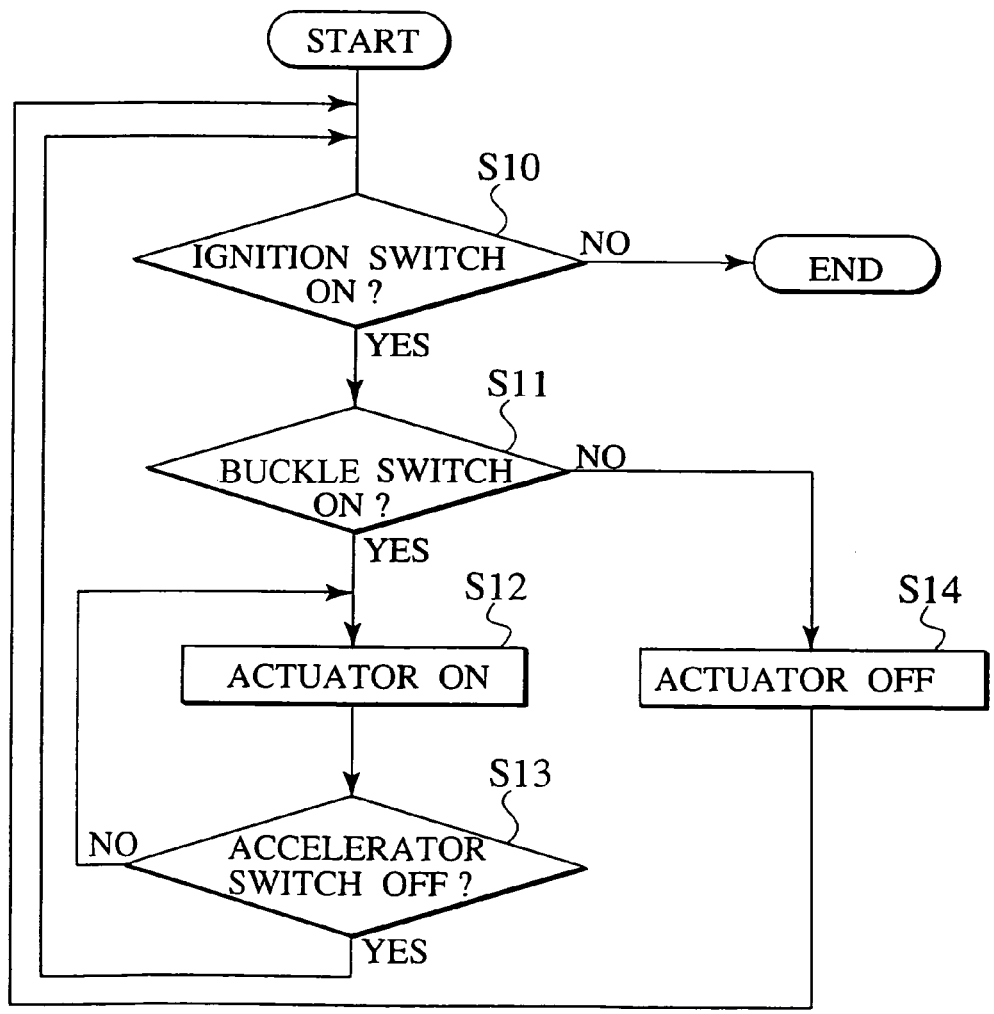
FIG. 10 is a flowchart for performing a control of the actuator according to the third embodiment of the present invention.

FIG. 9 and FIG. 10 show a third embodiment of the present invention, FIG. 9 is an actuator activation circuit diagram and FIG. 10 is a flowchart for performing a control of the actuator.

In this accelerator pedal device according to the third embodiment, as shown in FIG. 9, the electromagnetic actuator 11 is operated by the controller 19 based on a detecting operation of the buckle switch 17 and a detecting operation of an accelerator switch 40 as an accelerator state detecting unit which detects a treading and release of the accelerator pedal.

The accelerator switch 40 turns on when treading the accelerator pedal, and turns off when releasing the accelerator pedal so that the accelerator pedal returns to its initial position.

The controller 19 receives each ON or OFF signal from the buckle switch 17, the ignition switch 18 and the accelerator switch 40. If the buckle switch 17 is turned on due to unfastened seat belt 14 in the state where the ignition switch 18 is turned on, then the controller 19 supplies a drive signal to the electromagnetic actuator 11 to enhance the reactive force against pressure on the accelerator pedal. This operation is similar to the first embodiment.

In the third embodiment, after enhancing the reactive force of the accelerator pedal due to ON operation of the electromagnetic actuator 11, the electromagnetic actuator 11 does not cancel the enhancement of the reactive force immediately, even if the buckle switch 17 turns off due to fastened seat belt 14, and continues to enhance the reactive force until the accelerator pedal returns to its initial position. When the accelerator pedal returns to its initial position and the accelerator switch 40 turns off, if the fastened state of the seat belt 14 is detected, then the electromagnetic actuator 11 turns off to cancel the enhancement of the reactive force.

Now, the control of the electromagnetic actuator 11 by the controller 19 is explained with reference to the flowchart of FIG. 10. First, when making a judgment that the ignition switch 18 turns on so that the engine starts at the step S10 and making a judgment that the buckle switch 17 turns on (unfastened seatbelt) at the step S11, the electromagnetic actuator 11 turns on at the step S12. When making a judgment that the buckle switch 17 turns off (fastened seatbelt) at the step S11, the electromagnetic actuator 11 turns off at the step S14.

Next, when the electromagnetic actuator 11 turns on at the step S12, the accelerator state is detected at the step S13. When making a judgment that the accelerator switch 40 turns on (treading of the accelerator pedal) at the step S13, the flow returns to the step S12 to keep the electromagnetic actuator 11 in ON state.

At the step S13, when making a judgment that the accelerator switch 40 is in OFF state (release of the accelerator pedal), the flow returns to the step S10. The steps S10 to S13 are repeatedly performed to keep the electromagnetic actuator 11 in ON state until the judgment that the buckle switch 17 turns off (fastened seatbelt) at the step S11.

Namely, though urging the driver to fasten the seat belt by enhancing the reactive force of the accelerator pedal due to ON state of the electromagnetic actuator 11, even if the driver is aware of the enhancement of the reactive force to fasten the seat belt 14, the enhancement of the reactive force against the treading pressure on the accelerator pedal is not cancelled immediately to keep the enhancement of the reactive force. When releasing the accelerator pedal once after fastening the seat belt 14 so that the accelerator pedal returns to its initial position and the accelerator switch 40 turns off, the enhancement of the reactive force of the accelerator pedal is cancelled.

With this configuration, when the driver fastens the seat belt 14 so that the buckle switch 17 turns off during the treading operation of the accelerator pedal in unfastened seat belt state, it is possible to avoid the driver feels unfit for the accelerator pedal because the reactive force of the accelerator pedal suddenly becomes smaller.

Specifically, in the third embodiment, since the damper mechanism 21 of the first and second embodiments is not necessary to the accelerator pedal device, it is advantageous in cost, weight and layout of parts in comparison with the first and second embodiments.

Incidentally, the accelerator pedal device of the present invention has been described based on the examples of the first, second and third embodiments. However, the present invention is not limited to these embodiments but may adopt other embodiments within the scope of the invention. For example, the pedal reactive force enhancer may be composed of a damper mechanism configured to suppress pressing on the pedal arm 2, a friction enhancing mechanism configured to enhance friction resistance in the position where the pedal arm 2 is pivotally supported (the position where the spindle 9 is arranged), and the like.

Japanese Patent Applications No. 2002-295972 (filed on Oct. 9, 2002) and No. 2003-309983 (filed on Sep. 2, 2003) are incorporated herein by reference in its entirety.

What is claimed is:

1. An accelerator pedal device comprising:

a belt fastening detector configured to detect fastening and unfastening states of a seat belt; and a pedal reactive force enhancer configured to enhance reactive force against treading pressure on an accelerator pedal when an ignition switch is on while the seat belt is unfastened, based on a detecting operation of the belt fastening detector, wherein the pedal reactive force enhancer comprises a spring tension enhancing mechanism configured to enhance tension of a return spring being mounted to be connected between a pedal arm and a pedal support member to retain the pedal arm in an initial position, wherein the spring tension enhancing mechanism includes:

a lever being rotatably and pivotally supported on the pedal support member, on a lower end of which one end of the return spring is hooked; and an actuator being operated based on the detecting operation of the belt fastening detector so as to push an upper end of the lever and to enhance the tension of the return spring.

2. The accelerator pedal device according to claim 1, wherein the upper end of the lever contacts slidably with a cam portion of a cam plate being disposed slidably on the pedal support member, and the lever moves in a direction to enhance the tension of the spring by pushing to move the cam plate in response to an operation of the actuator.

3. The accelerator pedal device according to claim 1, further comprising:

a damper mechanism configured to suppress a sudden returning operation of the lever.

4. The accelerator pedal device according to claim 1, further comprising:

an accelerator state detecting unit configured to detect a treading and a release of the accelerator pedal, wherein the pedal reactive force enhancer continues to enhance the reactive force until a fastening state of the seat belt is detected by the belt fastening detector and a release of the accelerator pedal is detected by the accelerator state detecting unit.

* * * * *

UNITED STATES PATENT AND TRADEMARK OFFICE
CERTIFICATE OF CORRECTION

PATENT NO. : 7,093,515 B2 Page 1 of 1
APPLICATION NO. : 10/678092
DATED : August 22, 2006
INVENTOR(S) : Toshimi Yamanoi and Toshio Hirota It is certified that error appears in the above-identified patent and that said Letters Patent is hereby corrected as shown below:

On Title Page,
Item (30) Foreign Application Priority Data

Oct. 9, 2002 (JP)     2002-295972

Sep. 2, 2003 (JP)     2003-309983

Signed and Sealed this

Seventh Day of November, 2006

JON W. DUDAS
*Director of the United States Patent and Trademark Office*